United States Patent
Budolfsen et al.

(10) Patent No.: US 8,222,372 B2
(45) Date of Patent: Jul. 17, 2012

(54) WHEY PROTEIN HYDROLYSATE

(75) Inventors: Gitte Budolfsen, Frederiksberg (DK);
Per Munk Nielsen, Hilleroed (DK)

(73) Assignee: Novozymes A/S, Bagsvaerd (DK)

( * ) Notice: Subject to any disclaimer, the term of this patent is extended or adjusted under 35 U.S.C. 154(b) by 446 days.

(21) Appl. No.: 12/102,999

(22) Filed: Apr. 15, 2008

(65) Prior Publication Data
US 2008/0254505 A1    Oct. 16, 2008

Related U.S. Application Data

(60) Provisional application No. 60/911,935, filed on Apr. 16, 2007.

(51) Int. Cl.
*C12P 21/06* (2006.01)
(52) U.S. Cl. ........................................ 530/350; 435/68.1
(58) Field of Classification Search .................. None
See application file for complete search history.

(56) References Cited

U.S. PATENT DOCUMENTS 5,691,165 A    11/1997  Nielsen et al.
5,866,357 A    2/1999   Dambmann et al.

FOREIGN PATENT DOCUMENTS

WO    WO 97/43910    * 11/1997

OTHER PUBLICATIONS

Nielsen, Food Proteins and Their Applications, pp. 443-472 (1997).
Madsen et al., International Dairy Journal, vol. 7, No. 6-7, pp. 399-409 (1997).

* cited by examiner

*Primary Examiner* — Cecilia Tsang
*Assistant Examiner* — Roy Teller
(74) *Attorney, Agent, or Firm* — Kristin J. McNamara

(57) ABSTRACT

The present invention relates to a method of producing a whey protein hydrolysate using a microbial endopeptidase which specifically cleaves on the carboxy terminal side of arginine or lysine. The invention also relates to use of such whey protein hydrolysate in sports drinks or in clinical nutrition.

17 Claims, No Drawings

WHEY PROTEIN HYDROLYSATE

CROSS-REFERENCE TO RELATED APPLICATIONS

This application claims priority or the benefit under 35 U.S.C. 119 of U.S. provisional application No. 60/911,935 filed Apr. 16, 2007, the contents of which are fully incorporated herein by reference.

FIELD OF THE INVENTION

The present invention relates to a method of producing a whey protein hydrolysate using a microbial endopeptidase.

BACKGROUND OF THE INVENTION

Protein supplements, such as whey protein powder, are commonly used by bodybuilders and other athletes to accelerate muscle development and aid in recovery. Likewise, such protein supplements are useful for clinical nutrition. In general, pre-digested, partially hydrolyzed whey proteins are absorbed more easily than unhydrolysed protein, why protein hydrolysates are considered having nutritional benefits. But whereas unhydrolyzed whey protein is mild to slightly milky in taste, hydrolyzed whey protein tends to taste quite different, usually in a way that many find undesirable. Therefore, when such hydrolysates are used in, e.g., beverages, the taste has to be masked, e.g., by addition of artificial flavour.

Hydrolysis of protein using specific endopeptidases is known in the art, see e.g., WO 97/43910. The hydrolysis of beta-lactoglobulin, which is one of the proteins present in whey protein, has been studied in Madsen et al., 1997, *Int. Dairy Journal*, 7: 399-409. Hydrolysis of epitopes of beta-lactoglobulin with different proteases is also described in Food Proteins and Their Applications; Ed. S. Damodaran & A. Paraf; Marcel Dekker, New York, 1997; pp. 443-472.

SUMMARY OF THE INVENTION

The present inventors have surprisingly found a method for producing a whey protein hydrolysate, wherein the whey protein is subjected to treatment with a microbial endopeptidase having specificity for arginine and lysine, followed by inactivation of the endopeptidase, which gives rise to a hydrolysate having a pleasant taste. The hydrolysate may even have a better taste than unhydrolysed whey protein. Further, the whey protein hydrolysate obtained by the method of the invention is stable and has a reduced tendency to gel upon heat treatment as compared to hydrolysates obtained with other endopeptidases.

The present invention therefore relates to a method for producing a whey protein hydrolysate comprising:

a) providing an aqueous composition of whey protein comprising beta-lactoglobulin and alpha-lactalbumin;
b) subjecting said composition to the action of a microbial endopeptidase which specifically cleaves on the carboxy terminal side of arginine or lysine; and
c) inactivating the endopeptidase.

The present invention also relates to use of a whey protein hydrolysate obtained by above method in clinical nutrition or in an energy drink or a sports drink.

DETAILED DISCLOSURE OF THE INVENTION

As mentioned above, the present invention relates to a method for producing a whey protein hydrolysate comprising:

a) providing an aqueous composition of whey protein comprising beta-lactoglobulin and alpha-lactalbumin;
b) subjecting said composition to the action of a microbial endopeptidase which specifically cleaves on the carboxy terminal side of arginine or lysine; and
c) inactivating the endopeptidase.

The whey protein to be used in the method of the invention is to be understood as proteins which may be obtainable from whey, such as proteins isolated from whey. Whey may be defined as the liquid portion which separates when milk coagulates by acid and/or rennet. Whey may thus be a by-product from cheese production or from casein production. Milk in the context of the present invention may be derived from any mammal, such as cows, goats, sheep, donkeys, camels, camelids, yaks, or buffalos. In a preferred aspect, the milk is cow's milk.

Whey protein to be used in the method of the invention comprises beta-lactoglobulin and alpha-lactalbumin. It may also comprise other proteins obtainable from whey, such as serum albumin. The aqueous composition of step a) may also comprise other proteins which are not obtainable from whey.

In a preferred aspect, the aqueous composition of step a) comprises at least 15%, such as at least 20%, at least 25%, at least 30%, at least 35%, at least 40%, at least 45%, at least 50%, at least 55% or at least 60% beta-lactoglobulin of total dry matter. In another preferred aspect, the aqueous composition of step a) comprises at least 5%, such as at least 10%, at least 15% or at least 20% alpha-lactalbumin of total dry matter. In another aspect, the aqueous composition of step a) comprises at least 1%, such as at least 2%, at least 3%, at least 4% or at least 5% serum albumin of total dry matter.

In another preferred aspect, the aqueous composition of step a) comprises at least 15% (w/w), such as at least 20% (w/w), at least 25% (w/w), at least 30% (w/w), at least 35% (w/w), at least 40% (w/w), at least 45% (w/w), at least 50% (w/w), at least 55% (w/w) or at least 60% (w/w) beta-lactoglobulin of total protein. In another preferred aspect, the aqueous composition of step a) comprises at least 5% (w/w), such as at least 10% (w/w), at least 15% (w/w) or at least 20% (w/w) alpha-lactalbumin of total protein. In another aspect, the aqueous composition of step a) comprises at least 1% (w/w), such as at least 2% (w/w), at least 3% (w/w), at least 4% (w/w) or at least 5% (w/w) serum albumin of total protein.

Preferably, the whey protein has been isolated from whey and the ratio between beta-lactoglobulin and alpha-lactalbumin is in essence the same as in the whey from which it was isolated.

In one preferred embodiment, the whey protein used in the method may be a whey protein concentrate, which has a protein content of about 29% to less than about 90% on a moisture-free basis. Whey protein concentrates contain a low level of fat and cholesterol but generally have higher levels of carbohydrates in the form of lactose.

In another embodiment, the whey protein may be a whey protein isolate. In general, whey protein isolates have a protein content of at least about 90% whey protein on a moisture-free basis. Such isolates have in general been processed to remove the fat and lactose.

The whey protein to be used in the method of the invention may be a blend of whey protein concentrate and whey protein isolate.

The whey protein may comprise intact whey proteins or it may comprise partially hydrolyzed whey proteins.

In the method of the invention, the whey protein material is typically mixed or dispersed in water to form a slurry comprising about 1% to about 20% protein by weight. In one embodiment, the slurry may comprise about 1% to about 5% protein by weight. In another embodiment, the slurry may comprise about 6% to about 10% protein by weight In a further embodiment, the slurry may comprise about 11% to about 15% protein by weight. In still another embodiment, the slurry may comprise about 16% to about 20% protein by weight.

After the protein material is dispersed in water, the pH and the temperature of the protein slurry may be adjusted so as to optimize the hydrolysis reaction, and in particular, to ensure that the endopeptidase used in the hydrolysis reaction functions near its optimal activity level. The pH of the protein slurry may be adjusted and monitored according to methods generally known in the art. The pH of the protein slurry may be adjusted and maintained at from about 5.0 to about 10.0. In one embodiment, the pH of the protein slurry may be adjusted and maintained at from about 6.5 to about 8.0. In a preferred embodiment, the pH of the protein slurry may be adjusted and maintained at about 7.5. The temperature of the protein slurry is preferably adjusted and maintained at from about 40° C. to about 70° C. during the hydrolysis reaction in accordance with methods known in the art. In a preferred embodiment, the temperature of the protein slurry may be adjusted and maintained at from about 40° C. to about 60° C. during the hydrolysis reaction. In general, temperatures above this range may inactivate the endopeptidase, while temperatures below or above this range tend to slow the activity of the endopeptidase.

The hydrolysis reaction is generally initiated by adding an endopeptidase to the slurry of protein material.

Endopeptidases to be used in the method of the invention cleave specifically on the carboxy terminal side of either an arginine residue or a lysine residue. By "cleaving specifically" is meant that the endopeptidase has a higher specificity for cleaving on the carboxy terminal side of either arginine or lysine than for cleaving on the carboxy terminal side of any other amino acid. In one embodiment, the endopeptidase specifically cleaves on the carboxy terminal side of arginine, meaning that the endopeptidase has a higher specificity for cleaving on the carboxy terminal side of arginine than for cleaving on the carboxy terminal side of any other amino acid.

Typically, the endopeptidase has optimal proteolytic activity at a pH from about 6.0 to about 11.0, preferably at a pH from about 8 to about 10, and at a temperature from about 40° C. to about 70° C., preferably at a temperature from about 45° C. to about 60° C. or from about 45° C. to about 55° C.

An endopeptidase to be used in the method of the invention is of microbial origin. The use of microbial enzymes, rather than animal or plant enzymes, is advantageous in that microbial enzymes exhibit a broad spectrum of characteristics (pH optima, temperature etc.) and may be consistently obtainable in relatively large quantities.

The endopeptidase is preferably a trypsin-like endopeptidase of microbial origin. In the context of the present invention, a trypsin-like endopeptidase is an endopeptidase having a specificity similar to that of trypsin, e.g., an endopeptidase having a Trypsin ratio of more than 100, wherein the Trypsin ratio is determined as the activity of the enzyme when cleaving after Arg or Lys (whichever is the larger) divided by the activity of the enzyme when cleaving after any other amino acid. Such activity measurements to determine the Trypsin ratio should be performed at a pH-value where the activity of the endopeptidase is at least half of the activity of the endopeptidase at its pH optimum. The Trypsin ratio may be determined as described in Example 3 of the present application.

In one embodiment, the endopeptidase is a bacterial endopeptidase.

In another embodiment, the endopeptidase is a fungal endopeptidase. In a preferred embodiment, the endopeptidase is from a strain of *Fusarium*, preferably *Fusarium oxysporum*, e.g., having the amino acid sequence shown as SEQ ID NO: 2 of the present application (SWISSPROT No. P35049). A trypsin-like endopeptidase from *Fusarium oxysporum* having the amino acid sequence shown as amino acids 25-248 of SEQ ID NO: 2 has previously been described (U.S. Pat. Nos. 5,288,627 and 5,693,520).

In one embodiment, the endopeptidase is a trypsin-like endopeptidase from *Achromobacter lyticus*, e.g., having the amino acid sequence shown as SEQ ID NO: 4 of the present application (UNIPROT:P15636). In another embodiment, the endopeptidase is a trypsin-like endopeptidase from *Fusarium solani*, e.g., AP977S having the amino acid sequence shown as SEQ ID NO: 6 of the present application (GENESEQP: ADZ80577). In another embodiment, the endopeptidase is a trypsin-like endopeptidase from *Fusarium* cf. *solani*, e.g., AP971 having the amino acid sequence shown as SEQ ID NO: 8 of the present application.

In one embodiment of the invention, the endopeptidase is selected from the group consisting of:

i) a polypeptide having an amino acid sequence which is at least 60%, 70%, 80%, 85%, 90%, 95% or 98% identical to (A) any of SEQ ID NO: 2, 4, 6 or 8, or (B) a fragment of any of these sequences having protease activity;

ii) a polypeptide which is encoded by a polynucleotide which is at least 60%, 70%, 80%, 85%, 90%, 95% or 98% identical to any of SEQ ID NO: 1, 3, 5 or 7;

iii) a polypeptide which is encoded by a polynucleotide whose complement hybridizes under at least low stringency conditions, preferably at least medium stringency, at least high stringency or at least very high stringency conditions, with any of SEQ ID NO: 1, 3, 5 or 7; and iv) a polypeptide having an amino acid sequence modified by substitution, deletion, and/or insertion of one or several amino acids in (A) any of SEQ ID NO: 2, 4, 6 or 8, or (B) a fragment of any of these sequences having protease activity.

A fragment of an amino acid sequences having protease activity may be the amino acid sequence of the active enzyme, e.g., after processing, such as after any signal peptide and/or propeptide has been cleaved off. Preferred fragments are amino acids 25-248 of SEQ ID NO: 2, amino acids 21-653 of SEQ ID NO: 4, amino acids 26-251 of SEQ ID NO: 6, or amino acids 18-250 of SEQ ID NO: 8.

In one preferred embodiment of the invention, the endopeptidase has an amino acid sequence which is at least 60%, 70%, 80%, 85%, 90%, 95% or 98% identical to amino acids 25-248 of SEQ ID NO: 2.

Very low to very high stringency conditions are defined as prehybridization and hybridization at 42° C. in 5×SSPE, 0.3% SDS, 200 microg/ml sheared and denatured salmon sperm DNA, and either 25% formamide for very low and low stringencies, 35% formamide for medium and medium-high stringencies, or 50% formamide for high and very high stringencies, following standard Southern blotting procedures for 12 to 24 hours optimally. The carrier material is finally washed three times each for 15 minutes using 2×SSC, 0.2% SDS preferably at least at 45° C. (very low stringency), more preferably at least at 50° C. (low stringency), more preferably at least at 55° C. (medium stringency), more preferably at least at 60° C. (medium-high stringency), even more preferably at least at 65° C. (high stringency), and most preferably at least at 70° C. (very high stringency). In a particular embodiment, the wash is conducted using 0.2×SSC, 0.2% SDS preferably at least at 45° C. (very low stringency), more preferably at least at 50° C. (low stringency), more preferably at least at 55° C. (medium stringency), more preferably at least at 60° C. (medium-high stringency), even more preferably at least at 65° C. (high stringency), and most preferably at least at 70° C. (very high stringency). In another particular embodiment, the wash is conducted using 0.1×SSC, 0.2% SDS preferably at least at 45° C. (very low stringency), more preferably at least at 50° C. (low stringency), more preferably at least at 55° C. (medium stringency), more preferably at least at 60° C. (medium-high stringency), even more preferably at least at 65° C. (high stringency), and most preferably at least at 70° C. (very high stringency).

For purposes of the present invention, the alignment of two amino acid sequences can be determined by using the Needle program from the EMBOSS package (Rice, Longden, and Bleasby, 2000, EMBOSS: The European Molecular Biology Open Software Suite, *Trends in Genetics* 16(6): 276-277; emboss.org) version 2.8.0. The Needle program implements the global alignment algorithm described in Needleman and Wunsch, 1970, *J. Mol. Biol.* 48: 443-453. The substitution matrix used is BLOSUM62, gap opening penalty is 10, and gap extension penalty is 0.5.

The degree of identity between two amino acid sequences is calculated as the number of exact matches in an alignment of the two sequences, divided by the length of the shortest of the two sequences. The result is expressed in percent identity. An exact match occurs when the two sequences have identical amino acid residues in the same positions of the overlap. The length of a sequence is the number of amino acid residues in the sequence (e.g., the length of SEQ ID NO: 2 is 248 amino acids).

The degree of identity between two nucleotide sequences is determined by the Wilbur-Lipman method (Wilbur and Lipman, 1983, Proceedings of the National Academy of Science USA 80: 726-730) using the LASERGENE™ MEGALIGN™ software (DNASTAR, Inc., Madison, Wis.) with an identity table and the following multiple alignment parameters: Gap penalty of 10 and gap length penalty of 10. Pairwise alignment parameters are Ktuple=3, gap penalty=3, and windows=20.

The degree of identity between nucleotide sequences is calculated as the number of exact matches in an alignment of the two sequences, divided by the length of the shortest of the two sequences. The result is expressed in percent identity. An exact match occurs when the two sequences have identical nucleotides in the same positions of the overlap. The length of a sequence is the number of nucleotides in the sequence (e.g., the length of SEQ ID NO: 1 is 744 nucleotides).

Preferably, the amount of microbial endopeptidase used in the method of the invention is from about 0.01 to about 500 AU (as defined below) per kg whey protein, preferably from about 0.1 to about 100 AU per kg whey protein, more preferably from about 0.5 to about 50 AU per kg whey protein.

One Anson Unit (AU) is defined as the amount of enzyme which under standard conditions (i.e., 25° C., pH 7.5 and 10 min. reaction time) digests haemoglobin at an initial rate such that there is liberated per minute an amount of TCA soluble product which gives the same colour with phenol reagent as one milliequivalent of tyrosine.

The amount of endopeptidase added to the protein material can and will vary depending upon the source of the protein material, the desired degree of hydrolysis, and the duration of the hydrolysis reaction. The amount of endopeptidase may range from about 1 mg of enzyme protein to about 5000 mg of enzyme protein per kilogram of protein material. In another embodiment, the amount may range from 10 mg of enzyme protein to about 2000 mg of enzyme protein per kilogram of protein material. In yet another embodiment, the amount may range from about 50 mg of enzyme protein to about 1000 mg of enzyme protein per kilogram of protein material.

As will be appreciated by a skilled artisan, the duration of the hydrolysis reaction can and will vary. Generally speaking, the duration of the hydrolysis reaction may range from a few minutes to many hours, such as, from about 30 minutes to about 48 hours.

Preferably, the treatment with microbial endopeptidase results in a whey protein hydrolysate having a degree of hydrolysis (DH) from about 0.1% to about 20%, more preferably from about 0.5% to about 10% or from about 0.5% to about 8%, even more preferably from about 1% to about 5%.

The degree of hydrolysis (DH) expresses the extent of the protein hydrolysis obtained by the method. In the context of the invention, the degree of hydrolysis (DH) is defined as follows:

$$DH = (\text{Number of peptide bonds cleaved/Total number of peptide bonds}) \times 100\%$$

The skilled person will know how to measure the DH.

In step c) of the method of the invention, the endopeptidase is inactivated. Such inactivation may be performed by any method known in the art, e.g., by heating to at least 70° C., such as to at least 75° C. or at least 80° C.

A whey protein hydrolysate obtained by the method of the invention may be used in a food product, e.g., in a beverage. Non-limiting examples of such food products include sports drinks or energy drinks. A whey protein hydrolysate obtained by the method of the invention may also be used in clinical nutrition, e.g., at hospitals.

Example 1

Five different proteolytic enzymes were used to hydrolyze whey protein concentrate (Lacprodan 80) from Arla Foods, Denmark (comprising about 80% protein of total dry matter). The enzymes and dosages were:
Trypsin-like protease from *Fusarium oxysporum*, dosage 500 mg enzyme protein/kg raw material.
PTN 6.0 (Novozymes A/S), dosage 0.5% of raw material.
Alcalase 2.4 L (Novozymes A/S), dosage 0.2% of raw material.
Neutrase 0.8 L (Novozymes A/S), dosage 1% of raw material.
Protamex 1.5 MG (Novozymes A/S), dosage 0.5% of raw material.

Whey protein concentrate was mixed with water (1:9) before addition of enzyme.

Hydrolysis took place at 50° C. in a beaker mounted with base addition (0.1 N NaOH) dosage system to keep pH constant at pH 7.5 until degree of hydrolysis (DH)=4%.

The samples were heated to 85° C. to inactivate the enzymes, and tested in sensory panel.

Triangle tests were used to compare the hydrolysate obtained with the microbial trypsin-like protease with each of the hydrolysates obtained with the other four enzymes. Six panelists each received three coded samples. They were told that two of the samples were the same and that one was different. Panelists were asked to identify the odd sample. The number of "correct answers" in below table indicates the number of panelists who were able to identify the odd sample. The panelists were also asked to select the least bitter of the samples in each triangle test.

The samples made with Alcalase, Neutrase and Protamex all had a clear tendency to gel during the pasteurization. The samples made with PTN and microbial trypsin-like protease stayed homogenous.

The samples were diluted to 3% protein content before the taste evaluation.

Results from the triangle taste evaluations are shown below. MTP is the experimental microbial trypsin-like protease from *Fusarium oxysporum*. Six panelists were included in the evaluation. If at least 5 correct answers were given (column 2), the difference between the samples was considered significant. The third and fourth columns are the number of panelists (with correct answers in second column) who found that either of the samples had a less bitter taste:

|  | Correct answers | Less bitter | |
|---|---|---|---|
| Trial 1, PTN | 5 | PTN 2 | MTP 3 |
| Trial 2, Alcalase | 4 | Alcalase | MTP 2 |
| Trial 3, Neutrase | 2 | Neutrase 1 | MTP |
| Trial 4, Protamex | 3 | Protamex 2 | MTP 1 |

The results show that there is a significant difference between the MTP and the PTN produced samples where the MTP produced samples were selected as being less bitter than the PTN produced samples. No significant difference was shown between the MTP produced samples and any of the samples produced with the enzymes not having Lys and Arg specificity (Alcalase, Neutrase, Protamex).

Example 2

Five different proteolytic enzymes were used to hydrolyze whey protein concentrate from Leprino Foods, US (comprising about 80% protein of total dry matter). The enzymes and dosages were:

Trypsin-like protease from *Fusarium oxysporum*, dosage 500 mg enzyme protein/kg raw material.
PTN 6.0 (Novozymes A/S), dosage 0.5% of raw material.
Alcalase 2.4 L (Novozymes A/S), dosage 0.2% of raw material.
Neutrase 0.8 L (Novozymes A/S), dosage 1% of raw material.
Protamex 1.5 MG (Novozymes A/S), dosage 0.5% of raw material.

Whey protein concentrate was mixed with water (1:9) before addition of enzyme.

Hydrolysis took place at 50° C. in a beaker mounted with base addition (0.1 N NaOH) dosage system to keep pH constant at pH 7.5 until degree of hydrolysis (DH)=4%.

The samples were heated to 85° C. to inactivate the enzymes, and tested in sensory panel.

Triangle tests were used to compare the hydrolysate obtained with the microbial trypsin-like protease with each of the hydrolysates obtained with the other four enzymes. Seven panelists each received three coded samples. They were told that two of the samples were the same and that one was different. Panelists were asked to identify the odd sample. The number of "correct answers" in below table indicates the number of panelists who were able to identify the odd sample. The panelists were also asked to select the least bitter of the samples in each triangle test.

All samples stayed homogenous during/after pasteurization.

The samples were diluted to 3% protein content before the taste evaluation.

Results from the triangle taste evaluations are shown below. MTP is the experimental microbial trypsin-like protease from *Fusarium oxysporum*. Seven panelists were included in the evaluation. If at least 5 correct answers were given (column 2), the difference between the samples was considered significant. The third and fourth columns are the number of panelists (with correct answers in second column) who found that either of the samples had a less bitter taste:

|  | Correct answers | Less bitter | |
|---|---|---|---|
| Trial 1, PTN | 5 | PTN | MTP 4 |
| Trial 2, Alcalase | 6 | Alcalase | MTP 4 |
| Trial 3, Neutrase | 2 | Neutrase | MTP 2 |
| Trial 4, Protamex | 3 | Protamex 3 | MTP |

The results show that there is a significant difference between the samples produced with MTP and the samples produced with either of Alcalase or PTN where the MTP produced samples were selected as being less bitter than both of Alcalase and PTN produced samples.

Example 3

Definition, Measurement and Calculation of Trypsin Ratio

Principle

To make a measurable assay for determining trypsin-like endopeptidase activity, we have used 10 different chromogenic substrates with the general formula Suc-AAPX-pNA- where X is the one letter abbreviation for one of the twenty natural amino acid residues. The endopeptidase will cleave on the carboxy terminal side of X and liberate a yellow color (para-nitroaniline), which can be measured. We have used these 10 different Suc-AAPX-pNA substrates available from Bachem (X=A, R, D, E, I, L, K, M, F and V) to make the measurement and calculation of what we call the Trypsin ratio.

A Trypsin-Like Endopeptidase in the Context of the Present Invention may be Defined as an Endopeptidase Having a Trypsin Ratio of More than 100.

The Trypsin ratio is calculated as the maximal activity on either Suc-AAPR-pNA or Suc-AAPK-pNA divided by the maximal activity on any of the eight other Suc-MPX-pNA substrates:

Trypsin ratio=max activity on *Suc-AAP(R/K)-pNA*/ max activity on *Suc-AAP*(non*R/K*)-*pNA*

The activity measurements should be performed at a pH-value where the activity is at least half of the activity at pH optimum.

Materials and Methods
Suc-AAPX-pNA Assay:
Substrates: Suc-AAPA-pNA (Bachem L-1775)
Suc-AAPR-pNA (Bachem L-1720)
Suc-MPD-pNA (Bachem L-1835)
Suc-MPE-pNA (Bachem L-1710)
Suc-AAPI-pNA (Bachem L-1790)
Suc-AAPL-pNA (Bachem L-1390)
Suc-AAPK-pNA (Bachem L-1725)
Suc-AAPM-pNA (Bachem L-1395)
Suc-AAPF-pNA (Bachem L-1400)
Suc-AAPV-pNA (Bachem L-1770)

Temperature: Room temperature (25° C.)
Assay buffer: 100 mM succinic acid, 100 mM HEPES, 100 mM CHES, 100 mM CABS, 1 mM $CaCl_2$, 150 mM KCl, 0.01% Triton X-100, pH 9.0.
Assay: 20 ul (microliter) peptidase dilution (diluted in 0.01% Triton X-100) was placed in a well in a Microtiter plate. The assay was started by adding 200 ul pNA substrate (50 mg dissolved in 1.0 ml DMSO and further diluted 90× with the Assay buffer). The initial increase in $OD_{405}$ was monitored as a measure of the peptidase activity. If a linear (or near linear) plot was not achieved in the 4 minutes measuring time, the peptidase was diluted further and the assay was repeated.
Peptidases: Alcalase (Novozymes A/S, Denmark)
  *Achromobacter lyticus* Lysyl-endopeptidase (SEQ ID NO: 4)
  Trypsin-like protease from *Fusarium oxysporum*
  Porcine trypsin (Novozymes A/S, Denmark)
  All enzymes were purified by chromatography to a high purity. Only one band was seen for each peptidase on coomassie stained SDS-PAGE gels.
Characteristics for Peptidases:
  Alcalase: $pH_{opt}$=pH 9 on Suc-AAPF-pNA.
  *Achromobacter lyticus* protease: $pH_{opt}$=pH 10 on Suc-AAPK-pNA.
  *Fusarium* trypsin-like protease: $pH_{opt}$=pH 10 on Boc-VLGR-pNA.
  *Porcine* trypsin: $pH_{opt}$=pH 10 on Boc-VLGR-pNA.
Results
  Specificity of peptidases on Suc-AAPX-pNA substrates at pH 9 and calculation of the Trypsin ratio:

The specificity experiment was performed at pH 9. As it is seen in the Materials and Methods paragraph, three of the tested peptidases have $pH_{opt}$>pH 9. However, for these three peptidases the activity at pH 9 is more than half of the activity at $pH_{opt}$. The results are shown in the Table below:

| Suc-AAPX-pNA | Alcalase | Achromobacter lyticus protease | Fusarium trypsin | Porcine trypsin |
|---|---|---|---|---|
| Suc-AAPA-pNA | 0.02497 | 0.00001 | 0.00000 | 0.00001 |
| Suc-AAPR-pNA | 0.01182 | 0.00001 | 1.00000 | 1.00000 |
| Suc-AAPD-pNA | 0.00053 | 0.00000 | 0.00000 | 0.00000 |
| Suc-AAPI-pNA | 0.00026 | 0.00000 | 0.00000 | 0.00000 |
| Suc-AAPM-pNA | 0.37582 | 0.00023 | 0.00002 | 0.00031 |
| Suc-AAPV-pNA | 0.00033 | 0.00000 | 0.00000 | 0.00000 |
| Suc-AAPL-pNA | 0.86502 | 0.00001 | 0.00000 | 0.00002 |
| Suc-AAPE-pNA | 0.00289 | 0.00000 | 0.00000 | 0.00000 |
| Suc-AAPK-pNA | 0.01900 | 1.00000 | 0.53071 | 0.51396 |
| Suc-AAPF-pNA | 1.00000 | 0.00001 | 0.00003 | 0.00057 |
| Max of Suc-AAP(R/K)-pNA | 0.01900 | 1.00000 | 1.00000 | 1.00000 |
| Max of Suc-AAP(nonR/K)-pNA | 1.00000 | 0.00023 | 0.00003 | 0.00057 |
| Trypsin ratio | 0.019 | 4300 | 33000 | 1750 |

The reported activity data for each endopeptidase in the Table is relative to the activity for the best Suc-MPX-pNA substrate.

It is seen that according to our definition, the *Achromobacter lyticus* protease, the *Fusarium* trypsin-like protease and *Procine* trypsin are trypsin-like endopeptidases, whereas Alcalase is not a trypsin-like endopeptidase.

The invention claimed is:

1. A method for producing a whey protein hydrolysate comprising:
   a) providing an aqueous composition of whey protein comprising beta-lactoglobulin and alpha-lactalbumin;
   b) subjecting said composition to the action of a microbial endopeptidase which specifically cleaves on the carboxy terminal side of arginine or lysine; and
   c) inactivating the endopeptidase.

2. The method of claim 1, wherein the microbial endopeptidase is a fungal endopeptidase.

3. The method of claim 2, wherein the fungal endopeptidase is derived from a strain of *Fusarium*.

4. The method of claim 3, wherein the fungal endopeptidase is derived from a strain of *Fusarium oxysporum*.

5. The method of claim 1, wherein the endopeptidase has optimal proteolytic activity at a pH from about 8 to about 10.

6. The method of claim 1, wherein the endopeptidase has optimal proteolytic activity at a temperature from about 45° C. to about 60° C.

7. The method of claim 1, wherein the endopeptidase is selected from the group consisting of:
   a) a polypeptide having an amino acid sequence which is at least 60% identical to (A) any of SEQ ID NO: 2, 4, 6 or 8;
   b) a polypeptide which is encoded by a polynucleotide which is at least 60% identical any of SEQ ID NO: 1, 3, 5 or 7;
   c) a polypeptide which is encoded by a polynucleotide whose complement hybridizes under low stringency conditions with any of SEQ ID NO: 1, 3, 5 or 7; and
   d) a polypeptide having an amino acid sequence modified by substitution, deletion, and/or insertion of one or several amino acids in (A) any of SEQ ID NO: 2, 4, 6 or 8.

8. The method of claim 1, wherein the whey protein is whey protein concentrate or whey protein isolate.

9. The method of claim 1, wherein the aqueous solution of whey protein comprises at least 5% alpha-lactalbumin of total dry matter.

10. The method of claim 1, wherein the whey protein hydrolysate has a degree of hydrolysis from about 0.1% to about 20%.

11. The method of claim 10, wherein the whey protein hydrolysate has a degree of hydrolysis from about 0.5% to about 8%.

12. The method of claim 1, wherein step c) comprises heating to at least 70° C.

13. The method of claim 1, wherein the endopeptidase is added at a concentration of 0.01-10 g enzyme protein pr kg whey protein.

14. The method of claim 1, wherein the endopeptidase is selected from the group consisting of:
   a) a polypeptide having an amino acid sequence which is at least 80% identical to (A) any of SEQ ID NO: 2, 4, 6 or 8;
   b) a polypeptide which is encoded by a polynucleotide which is at least 80% identical to any of SEQ ID NO: 1, 3, 5 or 7;
   c) a polypeptide which is encoded by a polynucleotide whose complement hybridizes under low stringency conditions with any of SEQ ID NO: 1, 3, 5 or 7; and d) a polypeptide having an amino acid sequence modified by substitution, deletion, and/or insertion of one or several amino acids in (A) any of SEQ ID NO: 2, 4, 6 or 8.

15. The method of claim 1, wherein the endopeptidase is selected from the group consisting of:
   a) a polypeptide having an amino acid sequence which is at least 90% identical to (A) any of SEQ ID NO: 2, 4, 6 or 8;
   b) a polypeptide which is encoded by a polynucleotide which is at least 90% identical to any of SEQ ID NO: 1, 3, 5 or 7;
   c) a polypeptide which is encoded by a polynucleotide whose complement hybridizes under low stringency conditions with any of SEQ ID NO: 1, 3, 5 or 7; and
   d) a polypeptide having an amino acid sequence modified by substitution, deletion, and/or insertion of one or several amino acids in (A) any of SEQ ID NO: 2, 4, 6 or 8.

16. The method of claim 1, wherein the endopeptidase is selected from the group consisting of:
   a) a polypeptide having an amino acid sequence which is at least 95% identical to (A) any of SEQ ID NO: 2, 4, 6 or 8;
   b) a polypeptide which is encoded by a polynucleotide which is at least 95% identical to any of SEQ ID NO: 1, 3, 5 or 7;
   c) a polypeptide which is encoded by a polynucleotide whose complement hybridizes under low stringency conditions with any of SEQ ID NO: 1, 3, 5 or 7; and
   d) a polypeptide having an amino acid sequence modified by substitution, deletion, and/or insertion of one or several amino acids in (A) any of SEQ ID NO: 2, 4, 6 or 8.

17. The method of claim 1, wherein the endopeptidase is selected from the group consisting of:
   a) a polypeptide having an amino acid sequence which is at least 98% identical to (A) any of SEQ ID NO: 2, 4, 6 or 8;
   b) a polypeptide which is encoded by a polynucleotide which is at least 98% identical to any of SEQ ID NO: 1, 3, 5 or 7;
   c) a polypeptide which is encoded by a polynucleotide whose complement hybridizes under low stringency conditions with any of SEQ ID NO: 1, 3, 5 or 7; and
   d) a polypeptide having an amino acid sequence modified by substitution, deletion, and/or insertion of one or several amino acids in (A) any of SEQ ID NO: 2, 4, 6 or 8.

* * * * *

SEQUENCE LISTING

```
<160> NUMBER OF SEQ ID NOS: 8

<210> SEQ ID NO 1
<211> LENGTH: 744
<212> TYPE: DNA
<213> ORGANISM: Fusarium oxysporum

<400> SEQUENCE: 1
atggtcaagt tcgcttccgt cgttgcactt gttgctcccc tggctgctgc cgctcctcag      60
gagatcccca acattgttgg tggcacttct gccagcgctg gcgactttcc cttcatcgtg     120
agcattagcc gcaacggtgg cccctggtgt ggaggttctc tcctcaacgc caacaccgtc     180
ttgactgctg cccactgcgt ttccggatac gctcagagcg gtttccagat tcgtgctggc     240
agtctgtctc gcacttctgg tggtattacc tcctcgcttt cctccgtcag agttcaccct     300
agctacagcg gaaacaacaa cgatcttgct attctgaagc tctctacttc catccctcc     360 ggcggaaaca tcggctatgc tcgcctggct gcttccggct ctgaccctgt cgctggatct     420
tctgccactg ttgctggctg gggcgctacc tctgagggcg gcagctctac tcccgtcaac     480
cttctgaagg ttactgtccc tatcgtctct cgtgctacct gccgagctca gtacggcacc     540
tccgccatca ccaaccagat gttctgtgct ggtgtttctt ccggtggcaa ggactcttgc     600
cagggtgaca gcggcggccc catcgtcgac agctccaaca ctcttatcgg tgctgtctct     660
tggggtaacg gatgtgcccg acccaactac tctggtgtct atgccagcgt tggtgctctc     720
cgctctttca ttgacaccta tgct                                            744
```

<210> SEQ ID NO 2
<211> LENGTH: 248
<212> TYPE: PRT
<213> ORGANISM: Fusarium oxysporum

<400> SEQUENCE: 2

```
Met Val Lys Phe Ala Ser Val Val Ala Leu Val Ala Pro Leu Ala Ala
1               5                   10                  15
Ala Ala Pro Gln Glu Ile Pro Asn Ile Val Gly Gly Thr Ser Ala Ser
            20                  25                  30
Ala Gly Asp Phe Pro Phe Ile Val Ser Ile Ser Arg Asn Gly Gly Pro
        35                  40                  45
Trp Cys Gly Gly Ser Leu Leu Asn Ala Asn Thr Val Leu Thr Ala Ala
    50                  55                  60
His Cys Val Ser Gly Tyr Ala Gln Ser Gly Phe Gln Ile Arg Ala Gly
65                  70                  75                  80
Ser Leu Ser Arg Thr Ser Gly Gly Ile Thr Ser Ser Leu Ser Ser Val
                85                  90                  95
Arg Val His Pro Ser Tyr Ser Gly Asn Asn Asn Asp Leu Ala Ile Leu
            100                 105                 110
Lys Leu Ser Thr Ser Ile Pro Ser Gly Gly Asn Ile Gly Tyr Ala Arg
        115                 120                 125
Leu Ala Ala Ser Gly Ser Asp Pro Val Ala Gly Ser Ser Ala Thr Val
    130                 135                 140
Ala Gly Trp Gly Ala Thr Ser Glu Gly Gly Ser Ser Thr Pro Val Asn
145                 150                 155                 160
Leu Leu Lys Val Thr Val Pro Ile Val Ser Arg Ala Thr Cys Arg Ala
                165                 170                 175
Gln Tyr Gly Thr Ser Ala Ile Thr Asn Gln Met Phe Cys Ala Gly Val
            180                 185                 190
Ser Ser Gly Gly Lys Asp Ser Cys Gln Gly Asp Ser Gly Gly Pro Ile
        195                 200                 205
Val Asp Ser Ser Asn Thr Leu Ile Gly Ala Val Ser Trp Gly Asn Gly
    210                 215                 220
Cys Ala Arg Pro Asn Tyr Ser Gly Val Tyr Ala Ser Val Gly Ala Leu
225                 230                 235                 240
Arg Ser Phe Ile Asp Thr Tyr Ala
                245
```

<210> SEQ ID NO 3
<211> LENGTH: 1959
<212> TYPE: DNA
<213> ORGANISM: Achromobacter lyticus

<400> SEQUENCE: 3

```
atgaaacgca tttgtggttc cctgctgttg ctcggtttgt cgatcagcgc cgcgctcgcc      60
gccccggcct cgcgccccgc ggcgttcgat tacgccaatc tttccagcgt cgacaaggtc     120
gccttgcgca ccatgccggc ggtcgacgtg gccaaggcca aggccgaaga tttgcagcgc     180
gacaagcgcg gcgacatccc gcgcttcgcc ctggcgatcg acgtggacat gaccccctcag    240
aattccggcg cgtgggaata caccgccgac ggccagttcg ccgtatggcg ccagcgcgtt     300
cgttcggaga aggcgctgtc actgaacttc ggtttcaccg actactacat gcccgccggc     360
ggccgcctgc tggtatatcc ggcgactcag cgccggccg cgatcgcgg cttgatcagc       420
cagtacgacg ccagcaacaa caactcggcg cgccaactgt ggacggcggt ggtgccgggc     480
```

```
gccgaagcgg tgatcgaagc ggtgatcccg cgcgacaagg tcggcgagtt caagctgcgc    540
ctgaccaagg tcaaccacga ctacgtcggt ttcggcccgc tcgcgcgccg cctggccgct    600
gcgtccggcg agaagggcgt gtcgggttcg tgcaacatcg acgtggtctg ccccgaaggc    660
gacgccgcc gcgacatcat ccgcgcggtc ggtgcgtact cgaagagcgg cacgctggcc    720
tgtaccggtt cgctggtcaa caacaccgcc aacgaccgca agatgtactt cctgaccgcg    780
caccactgcg gcatgggcac ggcctcgacc ccgcgtcga tcgtggtgta ctggaactat    840
cagaactcga cctgccgcgc gcccaacacg ccggccagcg gcgccaacgg cgacggctcg    900
atgagccaga cccagtcggg ttcgacggtc aaggcgacct acgccacctc cgacttcacc    960
ctgctcgagt tgaacaatgc ggccaacccc gcgttcaacc tgttctgggc cggttgggac   1020
cgtcgcgacc agaactatcc cggcgcgatc gccatccacc atcccaacgt cgccgagaag   1080
cgcatcagca actccaccag cccgacctcg ttcgtggcct ggggcggcgg cgccggcacc   1140
acgcatttga acgtgcagtg gcagcccctcg ggcggcgtga ccgagccggg ttcgtcgggt   1200
tcgccgatct acagcccgga aaagcgcgtg ctcggccagc tgcacggcgg cccgtcgagc   1260
tgcagcgcca ccggcaccaa ccgcagcgac cagtacggcc gcgtgttcac ctcgtggacc   1320
ggcggcggcg ccgcggcctc gcgcctgagc gattggctcg atccggccag caccggcgcg   1380
cagttcatcg acggcctgga ttcggcggc ggcacgccga cactccgcc ggtgccgaac   1440
ttcacctcca ccaccagcgg cctgaccgcg accttcaccg acagctccac cgacagcgac   1500
ggttcgatcg cctcgcgtag ctggaacttc ggcgacggca gcacctcgac cgcgaccaac   1560
ccgagcaaga cctacgccgc ggcgggcacc tacaccgtca ccctgacggt caccgacaac   1620
ggcggcgcca ccaacaccaa gaccggttcg gtcaccgtgt ccggcggccc gggtgcgcag   1680
acctacacca cgacaccga tgtggcgatc ccggacaacg cgacggtcga aagcccgatc   1740
accgtgtccg gccgcaccgg caacggctcg cgcaccacgc cgatccaggt gacgatctac   1800
cacacctaca agagcgatct gaaggtggac ctggtcgcgc cggacggcac cgtctacaac   1860
ctgcacaacc gcaccggcgg cagcgcgcac aacatcatcc agaccttcac caaggacctg   1920
tcgagcgaag cggctcaacg ggcacctgga agctgcggg                          1959
```

<210> SEQ ID NO 4
<211> LENGTH: 653
<212> TYPE: PRT
<213> ORGANISM: Achromobacter lyticus

<400> SEQUENCE: 4

```
Met Lys Arg Ile Cys Gly Ser Leu Leu Leu Gly Leu Ser Ile Ser
1               5                   10                  15

Ala Ala Leu Ala Ala Pro Ala Ser Arg Pro Ala Ala Phe Asp Tyr Ala
            20                  25                  30

Asn Leu Ser Ser Val Asp Lys Val Ala Leu Arg Thr Met Pro Ala Val
        35                  40                  45

Asp Val Ala Lys Ala Lys Ala Glu Asp Leu Gln Arg Asp Lys Arg Gly
    50                  55                  60

Asp Ile Pro Arg Phe Ala Leu Ala Ile Asp Val Asp Met Thr Pro Gln
65                  70                  75                  80

Asn Ser Gly Ala Trp Glu Tyr Thr Ala Asp Gly Gln Phe Ala Val Trp
                85                  90                  95

Arg Gln Arg Val Arg Ser Glu Lys Ala Leu Ser Leu Asn Phe Gly Phe
            100                 105                 110

Thr Asp Tyr Tyr Met Pro Ala Gly Gly Arg Leu Leu Val Tyr Pro Ala
```

-continued

```
                115                 120                 125
Thr Gln Ala Pro Ala Gly Asp Arg Gly Leu Ile Ser Gln Tyr Asp Ala
130                 135                 140
Ser Asn Asn Ser Ala Arg Gln Leu Trp Thr Ala Val Val Pro Gly
145                 150                 155                 160
Ala Glu Ala Val Ile Glu Ala Val Ile Pro Arg Asp Lys Val Gly Glu
                165                 170                 175
Phe Lys Leu Arg Leu Thr Lys Val Asn His Asp Tyr Val Gly Phe Gly
                180                 185                 190
Pro Leu Ala Arg Arg Leu Ala Ala Ala Ser Gly Glu Lys Gly Val Ser
                195                 200                 205
Gly Ser Cys Asn Ile Asp Val Val Cys Pro Glu Gly Asp Gly Arg Arg
210                 215                 220
Asp Ile Ile Arg Ala Val Gly Ala Tyr Ser Lys Ser Gly Thr Leu Ala
225                 230                 235                 240
Cys Thr Gly Ser Leu Val Asn Asn Thr Ala Asn Asp Arg Lys Met Tyr
                245                 250                 255
Phe Leu Thr Ala His His Cys Gly Met Gly Thr Ala Ser Thr Ala Ala
                260                 265                 270
Ser Ile Val Val Tyr Trp Asn Tyr Gln Asn Ser Thr Cys Arg Ala Pro
                275                 280                 285
Asn Thr Pro Ala Ser Gly Ala Asn Gly Asp Gly Ser Met Ser Gln Thr
                290                 295                 300
Gln Ser Gly Ser Thr Val Lys Ala Thr Tyr Ala Thr Ser Asp Phe Thr
305                 310                 315                 320
Leu Leu Glu Leu Asn Asn Ala Ala Asn Pro Ala Phe Asn Leu Phe Trp
                325                 330                 335
Ala Gly Trp Asp Arg Arg Asp Gln Asn Tyr Pro Gly Ala Ile Ala Ile
                340                 345                 350
His His Pro Asn Val Ala Glu Lys Arg Ile Ser Asn Ser Thr Ser Pro
                355                 360                 365
Thr Ser Phe Val Ala Trp Gly Gly Gly Ala Gly Thr Thr His Leu Asn
370                 375                 380
Val Gln Trp Gln Pro Ser Gly Gly Val Thr Glu Pro Gly Ser Ser Gly
385                 390                 395                 400
Ser Pro Ile Tyr Ser Pro Glu Lys Arg Val Leu Gly Gln Leu His Gly
                405                 410                 415
Gly Pro Ser Ser Cys Ser Ala Thr Gly Thr Asn Arg Ser Asp Gln Tyr
                420                 425                 430
Gly Arg Val Phe Thr Ser Trp Thr Gly Gly Ala Ala Ser Arg
                435                 440                 445
Leu Ser Asp Trp Leu Asp Pro Ala Ser Thr Gly Ala Gln Phe Ile Asp
450                 455                 460
Gly Leu Asp Ser Gly Gly Gly Thr Pro Asn Thr Pro Val Ala Asn
465                 470                 475                 480
Phe Thr Ser Thr Thr Ser Gly Leu Thr Ala Thr Phe Thr Asp Ser Ser
                485                 490                 495
Thr Asp Ser Asp Gly Ser Ile Ala Ser Arg Ser Trp Asn Phe Gly Asp
                500                 505                 510
Gly Ser Thr Ser Thr Ala Thr Asn Pro Ser Lys Thr Tyr Ala Ala Ala
                515                 520                 525
Gly Thr Tyr Thr Val Thr Leu Thr Val Thr Asp Asn Gly Gly Ala Thr
530                 535                 540
```

```
Asn Thr Lys Thr Gly Ser Val Thr Val Ser Gly Gly Pro Gly Ala Gln
545                 550                 555                 560

Thr Tyr Thr Asn Asp Thr Asp Val Ala Ile Pro Asp Asn Ala Thr Val
            565                 570                 575

Glu Ser Pro Ile Thr Val Ser Gly Arg Thr Gly Asn Gly Ser Ala Thr
            580                 585                 590

Thr Pro Ile Gln Val Thr Ile Tyr His Thr Tyr Lys Ser Asp Leu Lys
        595                 600                 605

Val Asp Leu Val Ala Pro Asp Gly Thr Val Tyr Asn Leu His Asn Arg
610                 615                 620

Thr Gly Gly Ser Ala His Asn Ile Ile Gln Thr Phe Thr Lys Asp Leu
625                 630                 635                 640

Ser Ser Glu Ala Ala Gln Arg Ala Pro Gly Ser Cys Gly
                645                 650

<210> SEQ ID NO 5
<211> LENGTH: 753
<212> TYPE: DNA
<213> ORGANISM: Fusarium solani

<400> SEQUENCE: 5
atggtcaagt tgctgccat cctcgcactt gttgcgcctc ttgtcgccgc tcggcctcag      60
gactcatcac ccatgatcgt tggtggaact gctgccagcg ctggtgactt ccccttcatc    120
gtcagcatcg cctacaatgg tggcccttgg tgcggaggta ccctcctcaa cgccaacacc    180
gtcatgactg ctgcccactg cacccaaggt cgctctgcta cgccttcca ggtccgcgcc     240 ggaagtctga accgcaactc gggtggtgtt acctcttccg tttcttccat caggatccat    300
cctagcttca gtagctcgac cctgaacaac gatgtttcca tcctgaagct gtccaccccc    360
atctcgacta gctccactat ttcttatggt cgcctggctg cgtcgggctc tgaccctgtt    420
gccggctctg atgccacagt tgctggctgg ggtgtcactt tcagggctc ttccagctct     480 cccgtggctt tgaggaaggt taccattccc atcgtctccc gcaccacttg ccgatcccag    540
tatggcactt ctgccatcac caccaacatg ttctgcgctg gtcttgctga gggtggtaag    600
gactcttgcc agggcgacag cggcggtccc attgtcgata cctccaacac tgtcattggc    660
attgtttctt ggggtgaggg ttgtgctcag cccaacttat ctggtgtcta tgcccgagtt    720
ggatctctcc gcacttacat cgacggccag ctg                                 753

<210> SEQ ID NO 6
<211> LENGTH: 251
<212> TYPE: PRT
<213> ORGANISM: Fusarium solani

<400> SEQUENCE: 6

Met Val Lys Phe Ala Ala Ile Leu Ala Leu Val Ala Pro Leu Val Ala
1               5                   10                  15

Ala Arg Pro Gln Asp Ser Ser Pro Met Ile Val Gly Gly Thr Ala Ala
            20                  25                  30

Ser Ala Gly Asp Phe Pro Phe Ile Val Ser Ile Ala Tyr Asn Gly Gly
        35                  40                  45

Pro Trp Cys Gly Gly Thr Leu Leu Asn Ala Asn Thr Val Met Thr Ala
50                  55                  60

Ala His Cys Thr Gln Gly Arg Ser Ala Ser Ala Phe Gln Val Arg Ala
65                  70                  75                  80

Gly Ser Leu Asn Arg Asn Ser Gly Gly Val Thr Ser Val Ser Ser
                85                  90                  95
```

```
Ile Arg Ile His Pro Ser Phe Ser Ser Thr Leu Asn Asn Asp Val
        100                 105                 110
Ser Ile Leu Lys Leu Ser Thr Pro Ile Ser Thr Ser Thr Ile Ser
        115                 120                 125
Tyr Gly Arg Leu Ala Ala Ser Gly Ser Asp Pro Val Ala Gly Ser Asp
    130                 135                 140
Ala Thr Val Ala Gly Trp Gly Val Thr Ser Gln Gly Ser Ser Ser
145                 150                 155                 160
Pro Val Ala Leu Arg Lys Val Thr Ile Pro Ile Val Ser Arg Thr Thr
            165                 170                 175
Cys Arg Ser Gln Tyr Gly Thr Ser Ala Ile Thr Thr Asn Met Phe Cys
            180                 185                 190
Ala Gly Leu Ala Glu Gly Gly Lys Asp Ser Cys Gln Gly Asp Ser Gly
            195                 200                 205
Gly Pro Ile Val Asp Thr Ser Asn Thr Val Ile Gly Ile Val Ser Trp
    210                 215                 220
Gly Glu Gly Cys Ala Gln Pro Asn Leu Ser Gly Val Tyr Ala Arg Val
225                 230                 235                 240
Gly Ser Leu Arg Thr Tyr Ile Asp Gly Gln Leu
            245                 250
```

```
<210> SEQ ID NO 7
<211> LENGTH: 750
<212> TYPE: DNA
<213> ORGANISM: Fusarium cf. solani

<400> SEQUENCE: 7
atggtcaagt tgctgccat cctcgcactt gttgcgcctc ttgtcgccgc tcggcctcag      60
gaccgaccca tgattgtcgg cggaactgct gccagcgcag gtgacttccc cttcatcgtc     120
agcatcgcct acaatggtgg cccttggtgc ggaggtaccc tcctcaacgc cagcaccgtc     180
ttgactgctg cccactgcac ccaaggtcgc tctgctagcg ccttccaggt ccgcgctgga     240
agcttgaacc gcaactcggg tggtgttacc tctgccgttt cttccatccg gatccatcct     300
agcttcagtg gctcgaccct gaacaacgat gtttctatcc tgaagctgtc caccccatc      360
tcgactagct ccaccatctc ttatggtcgc ttggctgcgt cgggctccga ccctgctgcc     420
ggctctgatg ccacagttgc tggctggggt gtcacttctc agggctcttc cagctccccc     480
gtcgctttga ggaaggttac cattcccatt gtctctcgca ccacttgccg atcccagtat     540
ggcacttctg ccatcaccac caacatgttc tgcgctggcc ttgctgaggg tggaaaggac     600
tcttgccagg gcgacagcgg tggtcccatt gtcgacacct ccaacactgt cattggcatt     660
gtttcttggg gtgagggttg tgctcagccc aacttctctg gtgtctatgc ccgcgttggc     720
agcctccgct cttacattga cggccagctg                                      750
```

```
<210> SEQ ID NO 8
<211> LENGTH: 250
<212> TYPE: PRT
<213> ORGANISM: Fusarium cf. solani

<400> SEQUENCE: 8

Met Val Lys Phe Ala Ala Ile Leu Ala Leu Val Ala Pro Leu Val Ala
1               5                   10                  15
Ala Arg Pro Gln Asp Arg Pro Met Ile Val Gly Gly Thr Ala Ala Ser
            20                  25                  30
Ala Gly Asp Phe Pro Phe Ile Val Ser Ile Ala Tyr Asn Gly Gly Pro
```

-continued

```
            35                  40                  45
Trp Cys Gly Gly Thr Leu Leu Asn Ala Ser Thr Val Leu Thr Ala Ala
 50                      55                  60

His Cys Thr Gln Gly Arg Ser Ala Ser Ala Phe Gln Val Arg Ala Gly
 65              70                  75                      80

Ser Leu Asn Arg Asn Ser Gly Gly Val Thr Ser Ala Val Ser Ser Ile
                 85                  90                  95

Arg Ile His Pro Ser Phe Ser Gly Ser Thr Leu Asn Asn Asp Val Ser
            100                 105                 110

Ile Leu Lys Leu Ser Thr Pro Ile Ser Thr Ser Ser Thr Ile Ser Tyr
        115                 120                 125

Gly Arg Leu Ala Ala Ser Gly Ser Asp Pro Ala Ala Gly Ser Asp Ala
    130                 135                 140

Thr Val Ala Gly Trp Gly Val Thr Ser Gln Gly Ser Ser Ser Ser Pro
145                 150                 155                 160

Val Ala Leu Arg Lys Val Thr Ile Pro Ile Val Ser Arg Thr Thr Cys
             165                 170                 175

Arg Ser Gln Tyr Gly Thr Ser Ala Ile Thr Thr Asn Met Phe Cys Ala
                180                 185                 190

Gly Leu Ala Glu Gly Gly Lys Asp Ser Cys Gln Gly Asp Ser Gly Gly
         195                 200                 205

Pro Ile Val Asp Thr Ser Asn Thr Val Ile Gly Ile Val Ser Trp Gly
     210                 215                 220

Glu Gly Cys Ala Gln Pro Asn Phe Ser Gly Val Tyr Ala Arg Val Gly
225                 230                 235                 240

Ser Leu Arg Ser Tyr Ile Asp Gly Gln Leu
                245                 250
```